United States Patent
Czekajewski

[15] 3,651,318
[45] Mar. 21, 1972

[54] CARDIAC OUTPUT COMPUTER

[72] Inventor: Jan A. Czekajewski, 1591 Presidential Drive, Columbus, Ohio 43212

[22] Filed: Jan. 26, 1970

[21] Appl. No.: 5,888

[52] U.S. Cl. ...................235/183, 128/2.05 F, 128/2.1 R, 235/92 FL, 328/142, 328/165
[51] Int. Cl. ..........................G06g 7/18, A61b 5/02
[58] Field of Search...................235/183, 92 FL; 328/127; 128/2.05 F, 2.05 R, 2.1

[56] References Cited

UNITED STATES PATENTS

| | | | |
|---|---|---|---|
| 3,269,386 | 8/1966 | Sherman | 235/183 X |
| 3,433,935 | 3/1969 | Sherman | 235/183 |
| 3,304,413 | 2/1967 | Lehmann et al. | 235/92 FL |

OTHER PUBLICATIONS

Shubin et al.: Automated Measurement of Cardiac Output in Patients by use of a Digital Computer from: Medical & Biol. Engineering pp. 353–360 1967

Primary Examiner—Malcolm A. Morrison
Assistant Examiner—Felix D. Gruber
Attorney—Cushman, Darby & Cushman

[57] ABSTRACT

A method and apparatus for determining the rate of flow of a substance such as blood in a closed circulatory system whereby a detectable indicator substance is injected into the blood upstream of the heart and the density of that substance in the blood downstream measured and integrated in time to determine the flow of blood pumped through the heart in volume units per time. Distortion of the density waveform by recirculation and consequent error in the calculated flow rate is avoided by detecting two points on the exponential decay from the density peak and extrapolating the integral of the remainder of the wave form from these points. In contrast to prior art techniques, an analogue signal reflecting the integral of the waveform is produced and employed to obtain the flow of blood through the heart.

18 Claims, 4 Drawing Figures

INVENTOR
JAN A. CZEKAJEWSKI
BY Cushman Darby & Cushman
ATTORNEYS

CARDIAC OUTPUT COMPUTER

BRIEF DESCRIPTION OF THE PRIOR ART AND SUMMARY OF THE INVENTION

The invention relates to a method and apparatus for determining the rate of flow of blood or a similar liquid in a closed circulatory system by the injection of an indicator upstream of the heart and measuring and integrating the density of the injector downstream to determine the rate of flow.

For proper detection and treatment of many cardiac disorders it is necessary to accurately ascertain the rate at which the heart is pumping blood through the circulatory system. One simple and widely used technique for accomplishing this result is to inject a suitable indicator upstream of the heart and to measure the density of the indicator in the blood downstream. When the indicator mixes substantially uniformly with the blood and when the indicator is injected rapidly enough, the relation between the flow rate V in volume per unit of time and the amount of the injected indicator is roughly determined by the formula:

$$V = \frac{Q}{\int_0^\infty q\,dt}$$

where $Q$ = the amount of indicator injected downstream, $q$ = the density of the indicator detected downstream of the heart, and $\int_0^\infty q\,dt$ = the integral of the measured indicator density in time. Any indicator which may be properly injected and detected can be used and these include radioactive material, dye, hot or cold saline solutions, etc. For a detailed discussion of the use of indicator techniques see "Symposium on Use of Indicator-Dilution Technics in a Study of Circulation" Circulation Research, Vol. 10, No. 3, Part 2, March, 1962.

Moreover, the typical curve for the detected indicator density after the indicator is injected upstream and measured downstream increases relatively quickly in time to a peak value and then decays substantially exponentially to zero. However, in a closed circulatory system such as the human body, at some point during the exponential tail, the indicator fluid, which has already passed the detecting point and been detected, begins returning past the detecting point after a complete journey through the circulatory system and is redetected. When this occurs, the density curve is distorted and the tail of the curve loses its exponential character and the curve measured displays a second peak value which is, of course, substantially lower in amplitude than the first.

Because recirculation thus destroys a portion of the curve which is used to determine the flow rate, it is normally necessary to predict the distorted portion of the exponential tail from the undistorted portion and to determine the integral of that curve from the undistorted and the predicted portions. Since the most accurate portion of the exponential tail of the dilution curve normally occurs between 80 and 50 percent of the peak value, it is desirable to use points within this range to construct the portion of the theoretical exponential tail destroyed by recirculation. As discussed in greater detail below, it is well known and can be easily shown that the integral of an exponentially decaying curve is equal to the initial amplitude of the curve times a value $\tau$ where $\tau$ is the time required for the curve to decay to $l/e$ of its initial value. Accordingly, by selecting some point high on the exponential tail of the density waveform and integrating that value until the waveform has decayed to $l/e$ of that value, an integral which is theoretically identical to the integral of the waveform which is actually destroyed by recirculation is produced.

However, according to one aspect of the invention, it has been discovered that recirculation may even cloud results somewhat which are produced according to the above approach. As discussed in greater detail below, this problem can be overcome by integrating for only a portion, such as half, of the time necessary for the waveform to decay to the $l/e$ level and then multiplying the resulting value before adding it to the integral for the remainder of the density waveform.

In the Lehmann et al. U.S. Pat. No. 3,304,413, a similar arrangement for determining the flow rate of blood pumped through the heart by the injection of an indicator upstream and the subsequent detection and integration of the density of the indicator downstream of the heart is disclosed. In this arrangement, a densiometer is employed to produce digital signals which are eventually applied to a counter and stored so as to produce a final indication of the integral of the density waveform. However such digital signals are unsatisfactory in that they are not signals which can be easily displayed and read and which can be simply employed with other signals to produce a displayed information signal which yields directly the flow rate.

According to another aspect of the present invention, the density curve is employed to produce analog signals. Further, in one embodiment of the invention described below, the apparatus is designed to detect and indicate radical errors due to the mistake of personnel or the faults of peripheral equipment. Provision is also made for calibrating the apparatus.

Many other objects and purposes of the invention will become clear from the following detailed description of the drawings.

DETAILED DESCRIPTION OF THE DRAWINGS

Figure 1:
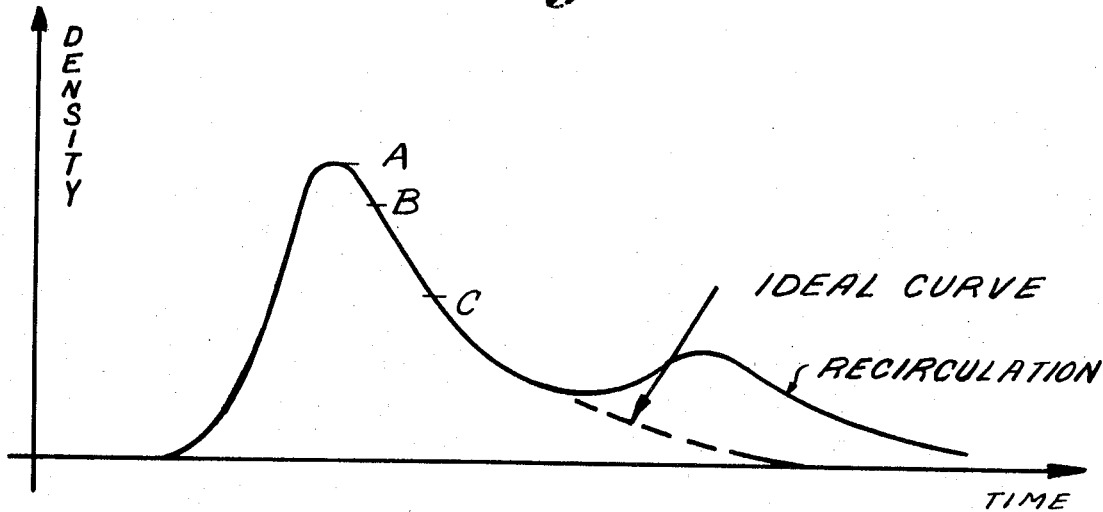
FIG. 1 shows a typical density curve for an indicator injected upstream of the heart and detected downstream of the heart.

Reference is now made to FIG. 1 which shows an ideal curve for the density of an indicator such as dye, warm or cold saline solution, radioactive isotope, etc. which has been injected rapidly into the circulatory system upstream of the heart and which has passed through the heart and been detected by a conventional densiometer downstream to produce the waveform shown. As discussed briefly above, the normal density waveform rises fairly steeply in time to a peak labeled A and then decays substantially exponentially toward zero. However, as discussed above, in a closed circulatory system, such as the human body, at some point during the exponential tail, indicator fluid which has already been detected returns past the detecting point and is once again detected to produce a second peak which, if employed to calculate the flow rate, will distort the flow rate determined from the curve.

Figure 2:
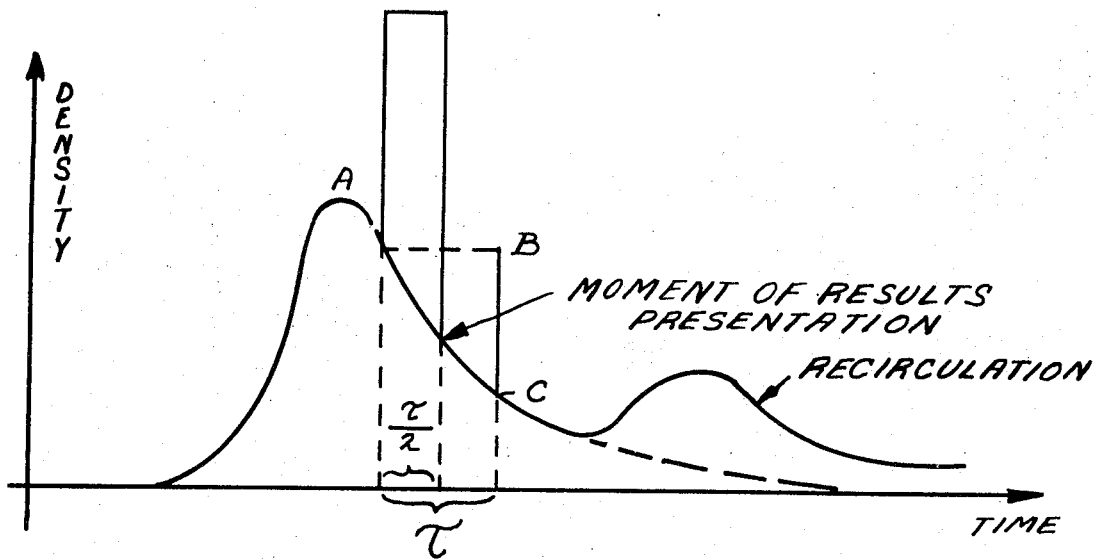
FIG. 2 shows a density curve as in FIG. 1 wherein the remainder of the curve from the point B can be simulated by integrating the value B for the time $\tau$ or integrating the value B for time $\tau/2$ and doubling that result.

Referring to FIG. 2, an approach is shown whereby this distortion resulting from recirculation can be eliminated by extrapolating the remaining distorted portion of the exponential curve from its relatively undistorted position. Referring to FIG. 1, the integral of the exponentially decaying tail from the level B to the theoretical zero value is:

$$\int_0^\infty Be^{-t/\tau}dt = \left(-\tau e^{-t/\tau}\right)\Big|_0^\infty = B[0-(-\tau)] = \tau B$$

This mathematical operation suggests that the area under the exponentially decaying curve can be simulated by a rectangle having a height equal to the amplitude of the exponentially decaying curve at its point of initiation and a width equal to the time constant $\tau$. Moreover, it should be apparent that the time constant $\tau$ is equal to the time which it takes the density waveform to decay from the level B to $1/e$ of its value or roughly 0.36788 B. Accordingly, by detecting the point B high on the exponential tail, similarly detecting a point C equal to 0.36788 B and integrating at the constant level B between these two points, an expression which is theoretically equivalent to the remainder of the exponentially decaying waveform is produced. This expression when added to the integral of the remainder of the waveform produces a signal which can be operated on to produce a number equal to the flow rate in whatever units are desired.

Moreover, as discussed briefly above, it has been noted that by the time that the waveform decays to $1/e$ of some convenient level B, substantial distortion exists. It has been discovered, however, that this distortion can be substantially eliminated by integrating the value B, not for some time $\tau$, but for some fraction of $\tau$, such as $\tau/2$, and then multiplying the resultant value accordingly before adding it to the remainder of the integrated waveform. In the example illustrated in FIG. 2, the interval $\tau/2$ is employed and the integration of B for time $\tau/2$ is then doubled to produce an expression which is theoretically equivalent to the remainder of the exponential tail.

Figure 3:
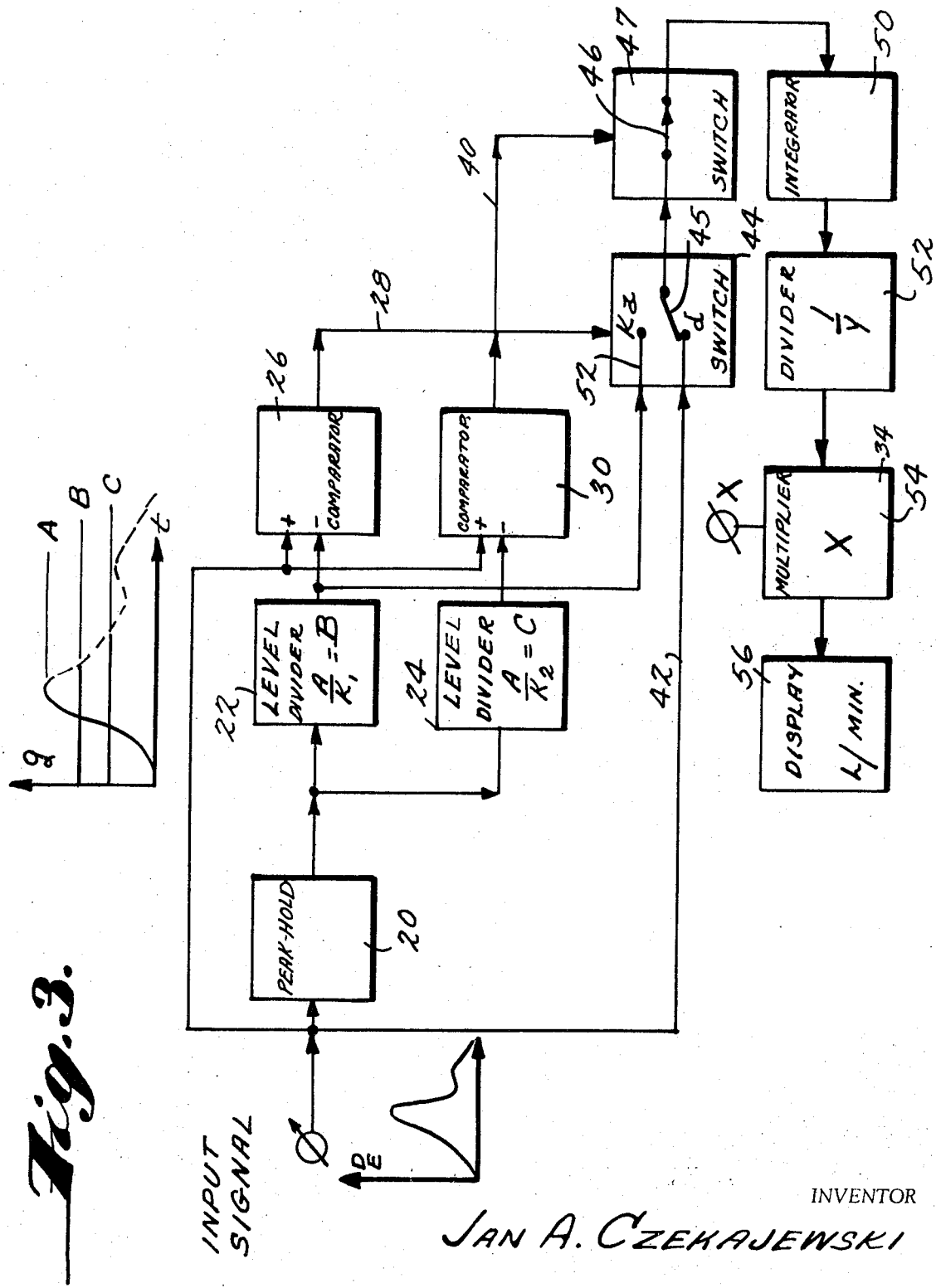
FIG. 3 shows in block diagram the invention of this application wherein the density signal is applied to an analogue circuit to produce an output reflecting the rate of flow of the blood or other liquid.

Reference is now made to FIG. 3 which shows a block diagram of the invention of this application for producing an analogue output signal and preferably displaying the rate of blood flow through the heart, or of any other liquid through a closed circulatory system. As shown in FIG. 3, an electrical signal from a suitable densiometer with a signal amplitude varying with the density of the indicator detected is applied to the input of the device and first passes to a conventional peak and hold circuit 20 which follows the curve as it rises rapidly to the peak level A and retains peak level A after the curve begins to exponentially decay. Peak hold circuit 20 passes its output, which, after the waveform begins to decay from peak A, remains at the level A, to conventional level or voltage dividers 22 and 24.

Level divider 22 is manually or automatically set to divide its input, which, during the exponential tail, is the peak level A, by a factor $K_1$ so as to generate an output signal level roughly equal to the level B, which is the level chosen to be integrated for the time $\tau$ or a portion of the time $\tau$ to simulate the remainder of the exponential tail. Level divider 24 likewise divides its input which during the tail is the peak value A by a second factor $K_2$ to generate the level C, which is the predetermined point on the exponentially decaying curve at which integration of the value B is to cease. As should be apparent from the discussion below, the separation in time between the levels B and C will be the time interval $\tau$ or a desired fraction thereof.

The output of level divider 22 is passed to a conventional comparator circuit 26 which also receives the initial input signal applied to peak hold circuit 20. Comparator circuit 26 is designed so that a suitable output signal, such as a pulse, is generated on output line 28 whenever both inputs to circuit 26 are at substantially the same level. Thus, a signal on line 28 is produced at the time the exponentially decaying waveform applied to circuit 20 and circuit 26 reaches level B. Similarly, comparator circuit 30 receives both an input from level divider 24 and the original waveform applied to circuit 20 so that, like comparator circuit 26, comparator circuit 30 generates a signal on its output line 40 whenever its two inputs have the same level. Thus an output, such as a pulse, on line 40 results at the time the decaying waveform reaches the level C.

The input signal to circuit 20, which represents the density of the indicator detected downstream of the heart, is also passed via line 42 to a switching circuit 44 which normally holds its controlled switch 45 in the illustrated position so that the input density waveform normally passes through switch 45 and the normally closed controlled switch 46 of switching circuit 47 to a conventional integrator 50. Integrator 50 thus integrates in time the density waveform as it rises toward the peak value A and as it begins to decay exponentially.

When comparator circuit 26 produces its output signal on line 28, that signal is transmitted to switching circuit 44 which responds by immediately shifting the position of its controlled switch 45 from the illustrated position and into connection with line 52. The movement of switch 45 disconnects integrator 50 from line 42 and hence from the density input waveform and connects it to the output of level divider 22 via line 52 so that integrator 50 thereafter integrates the constant level B until the switch 46 opens. When the waveform decays to level C and circuit 30 responds with an output on line 40, this output on line 40 is passed to switching circuit 47 which reacts by causing its controlled switch 46 to open, thus ending integration until the respective switches are reset automatically or manually in preparation for another determination of the rate of blood flow. Thus, the integrator 50 produces an output which is the same substantially as if a pure density waveform undistorted by recirculation had been integrated.

The output of integrator 50 is passed to conventional divider circuit 52 which divides the output by a factor Y and the output of the divider circuit 52 is then passed to a multiplier 54 which multiplies the signal by a factor X. The factors X and Y are determined in accordance with the amount of indicator injected upstream of the heart so that the output of multiplier 54 represents the final flow rate according to the relation discussed above. The factor X is preferably variable as shown in FIG. 3 in accordance with the amount of indicator injected. The electrical output of multiplier 54 is passed to a conventional display 56 so that the flow rate can be readily and quickly observed and the output of multiplier 54 may also be passed to any other suitable recorder or machine as necessary or desirable for recording or otherwise utilizing the electrical signals produced.

Figure 4:
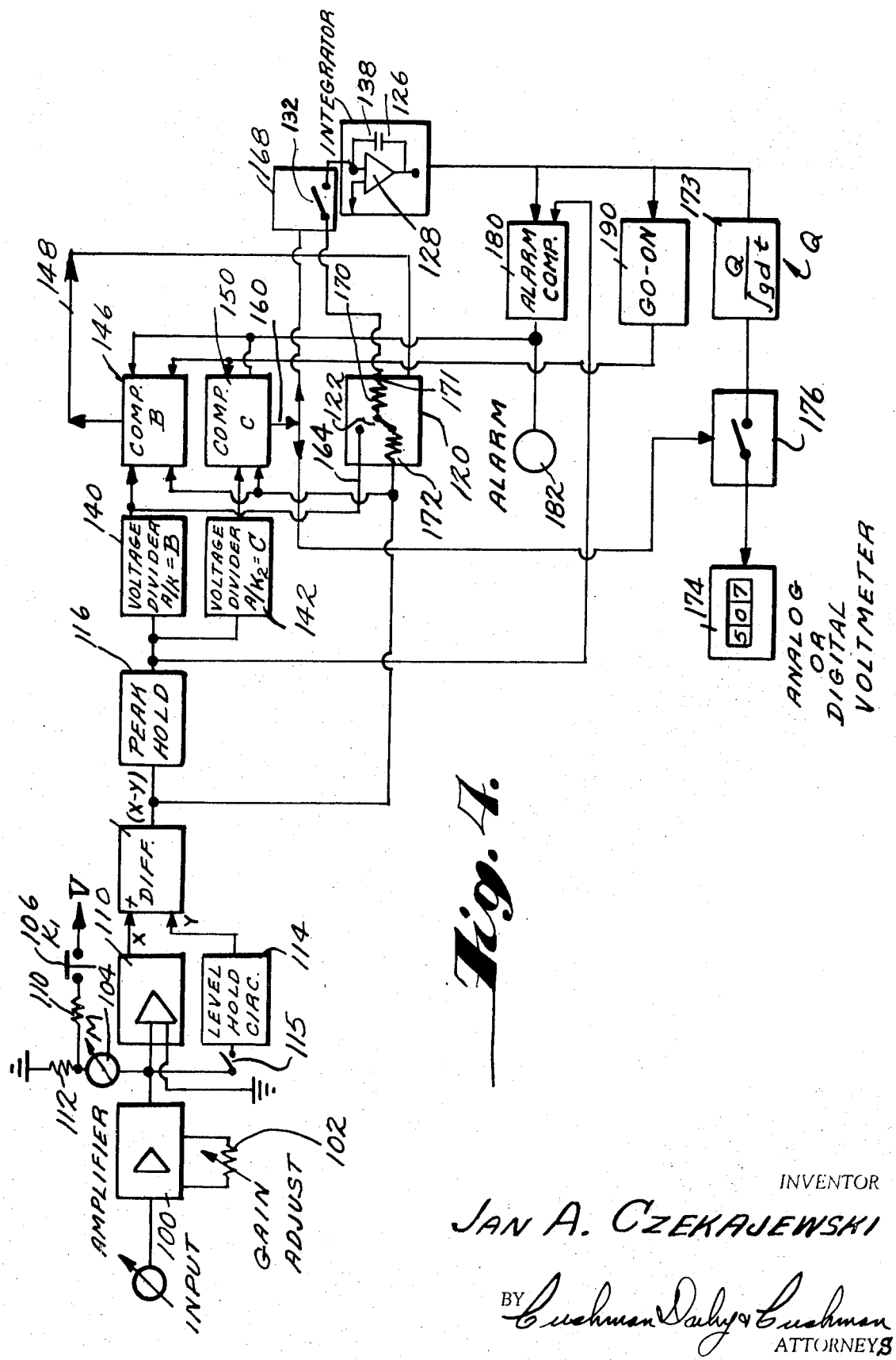
FIG. 4 shows a block diagram of another embodiment of the invention.

Reference is now made to FIG. 4 which shows another similar embodiment of the invention for processing a density waveform to derive the flow rate of blood or other liquid moving in a closed circulatory system. The input density waveform is first passed to a conventional amplifier 100 which is equipped with a conventional gain control 102. The amplified output of amplifier 100 then deflects a meter 104 from its zero position. Meter 104 is used for calibrating the equipment. Calibration is accomplished by first manually depressing switch 106, thus connecting the source of voltage V to the meter 104 via resistor 110, so that resistors 110 and 112 act as a voltage divider to apply a predetermined voltage to one side of the meter 104. Next a standard input is applied to the amplifier 100, which is chosen so that when amplifier 100 is properly adjusted the output of amplifier 100 will be exactly equal to the voltage which appears at the other side of meter 104 via the depressed switch 106. When these voltages are equal the meter M will deflect to zero and any deviation from zero can be corrected by properly adjusting the gain control 102. Thus, the arrangement shown in FIG. 4 permits a simple calibration of the arrangement by depressing switch 106 and applying a standard predetermined input signal to amplifier 100.

The output of the amplifier 100 is transmitted to a phase inverter 110 and from the phase inverter 110 to a differential circuit 112. The output of amplifier 100 is also passed to a level hold circuit 114 which serves to compensate for zero line drift after calibration. The output on level hold circuitry 114 is likewise applied to differential amplifier 112. A switch 115 is also provided between the level hold circuit 114 and the amplifier 100 and this switch is preferably manually opened when the computer is being calibrated as described above. Thus, circuitry 114 prevents undue drift of a signal from the desired preset level.

The output of the differential circuit 112 is applied to peak hold circuit 116 which operates in the same fashion as the peak hold circuit described above with regard to FIG. 3. The output of differential amplifier 112 is also applied to a switching circuit 120, with its controlled switch 122 normally in the position shown to connect the input signal to the peak hold circuit 116 to the integrator 126. In embodiment of FIG. 4, integrator 126 is simply a conventional operational amplifier 128 with a capacitance 130 connected in parallel with it. As in the embodiment of FIG. 3, a normally closed switch 132 connects the output of switch 120 to the integrator 126. Thus, the integrator 128 integrates the density waveform as it rises to its peak and begins its exponential decline until it reaches the level B.

The output of peak hold circuit 116 is also passed to voltage dividers 140 and 142 which divide the detected peak level by factors $K_1$ and $K_2$, respectively, to generate the levels B and C which correspond to the amplitude on the density curve at which the integration of the rectangle is to begin and the amplitude at which integration of the rectangle of height B and width $\tau$ is to cease. The output of voltage divider 140 is passed to a comparator circuit 146 which also receives the input to peak hold circuit 116 and produces an output signal on line 148 when the amplitudes of these two signals are substantially equal. Likewise, the comparator circuit 150 receives the output of voltage divider 142 together with the input to the peak hold circuit 116 and produces a suitable output signal on line 160 whenever these two inputs to circuit 150 are substantially equal.

The output signal produced by circuit 146 on line 148 is applied to control terminal 171 of switching circuit 120 to cause the switching circuit 120 to shift its controlled switch 122 from the illustrated position into connection with line 164 Circuit 120 can be any of a number of conventional devices which respond to an input signal by shifting a switch such as switch 122. The shifting of switch 122 connects integrator 126 to the output of the voltage divider 144 through a circuit 168 so that that integrator 126 thereafter integrates the value B until a switch 132 opens. The output of the signal comparator circuit 150 is passed to switching circuit 168 which in response opens its controlled switch 132 to end integration of the rectangular simulation of the remainder of the exponential tail at the time that the level C of the density waveform is detected Circuit 168 can be any conventional device which will open a controlled switch when a suitable signal is applied to it.

Moreover, the switch 120 shown in FIG. 3 is provided with resistors 170 and 172 so that when the switch shifts from its illustrated position into connection with line 164 that level B is, in effect, doubled or multiplied by some other factor with respect to the input density signal because of the relative values of the resistors 170 and 172. This multiplication permits the level C to be set much higher on the exponential curve than otherwise and, as shown in FIG. 2 and explained above, this permits use of only the least distorted portion of the exponential tail.

The output of the integrator 126 is passed to circuit 173 which performs a division of the factor Q by the output signal of integrator 126. The factor Q corresponds to the amount of indicator injected into the blood stream. The output of circuit 173 is transmitted to an analog or digital volt meter 174 or other suitable display device. If desired, the final signal can be recorded or otherwise employed by a digital computer or other device. A switch 176 is further provided between the circuitry 173 and 174 and this normally closed switch is opened when the comparator circuit 150 produces an output signal on line 160. The opening of switch 176 ends integration and freezes the value in the digital volt meter 174.

Further, the output of integrator circuit 126 is passed to an alarm comparator circuit 180 which also receives the input from the peak hold circuit 116. Circuit 180 continuously compares the output of the peak hold circuit 116 and the output of integrator 126 with the 10 v. reference signal and produces an alarm signal which is transmitted to a suitable alarm device 182 whenever any of these values achieves 10 v. saturation level. Preferably, the alarm device 182 includes a red or other colored light which warns the operator that a malfunction is taking place and circuitry 180 also blocks the outputs of comparator circuits 146 and 150 upon detection of a malfunction. Thus, if the input density signal is within the proper range but for some reason the integration continues beyond the proper time and integrator 126 is driven to saturation, an alarm signal results on an alarm device 182 to warn the operator.

Further, to prevent small error signals, which may appear as background from being displayed incorrectly as a flow rate Go-On circuitry 190 is provided. Circuitry 190 receives the output from integrator 126 and continuously transmits appropriate signals to comparators 146 and 150 which enable them to operate only when the output of integrator 126 exceeds a substantial preset value. After each operation of the device, all of the switches and comparator circuits are reset and the above procedure can then be repeated to determine flow rate from another input density curve.

It should be apparent from the above discussion that the novel invention of this application, while especially useful in determining the rate of flow of blood pumped by the heart, can also be used in other closed circulatory systems for determining flow rate of a fluid. Many changes and modifications in the embodiment of the invention discussed above can, of course, be made without departing from the scope of the invention, and that scope is intended to be limited only by the scope of the appended claims.

What is claimed is:

1. Apparatus for determining the rate of flow of fluid in a closed circulatory system whereby a detectable indicator is injected into the system at a first point and the density of the indicator is detected at a second point to generate an electrical waveform which rises to a peak value and decays thereafter substantially exponentially toward zero until recirculated indicator distorts the exponential tail comprising:
   means for receiving said waveform and producing an output level substantially equal to said peak value after said waveform passes said peak value,
   first means for dividing said output level by a given factor to produce a first level,
   second means for dividing said output level by a given factor to produce a second level,
   first means for comparing said waveform with said first level and producing a first signal when the amplitude of said waveform during the exponential decay is substantially equal to said first level,
   second means for comparing said waveform with said second level and producing a second signal when the amplitude of said waveform during the exponential decay is substantially equal to said second level,
   integrating means for receiving an input and producing a continuous integral of said input in the form of a continuous electrical signal, and
   means for transmitting said waveform to said integrating means so that said integrating means integrates said waveform, including means for disconnecting said integrating means from said waveform and connecting said integrating means to said first dividing means so that said integrating means thereafter integrates said first level when said first comparing means produces said first signal and means for disconnecting said integrating means from said first dividing means when said second comparing means produces said second signal.

2. Apparatus as in claim 1 wherein said disconnecting and connecting means includes switch means having a first position connecting said waveform to said integrating means and a second position connecting said first dividing means to said integrating means and means connected to said first comparing means for shifting said switch means from said first to said second position when said first signal is produced.

3. Apparatus as in claim 2 wherein said disconnecting means includes second switch means connecting said first switch means to said integrating means, and having an open and closed position and means connected to said second comparing means for shifting said second switch means from said closed to said open position when said second signal is produced.

4. Apparatus as in claim 1 including means for receiving said output level and said peak value, for comparing said output level and said peak value with the preset constant value and generating a malfunction signal when said comparison indicates equivalence.

5. Apparatus as in claim 1 including means connected to said output level receiving and producing means for receiving said output level and disabling said first and second comparing means when said output level is less than a given preset value.

6. Apparatus as in claim 1 including means connected to said first level producing means for receiving said first level and multiplying it by a given factor before said first level is integrated.

7. Apparatus as in claim 1 including means connected to said output level receiving and producing means for dividing said output level into a signal representing the amount of indicator injected so as to generate a signal indicating said rate of flow.

8. Apparatus as in claim 7 wherein said output dividing means includes means connected to said output level receiving and producing means for multiplying said output level by a first factor means for dividing said output by a second factor and means for varying said second factor.

9. Apparatus as in claim 1 further including means for calibrating said apparatus.

10. Apparatus as in claim 9 including means for receiving and amplifying said waveform and wherein said calibrating means includes meter means connected to the output of said amplifying means, means for applying a given voltage to said meter means so that when said amplifying means receives a given calibrating input signal said meter means will deflect to a given point, and means for adjusting the gain of said amplifying means.

11. Apparatus as in claim 1 including means connected to said output level receiving and producing means for using said output level to determine said rate of flow and means for displaying said rate of flow.

12. Apparatus for determining the rate of flow of fluid in a closed circulatory system whereby a detectable indicator is injected into the system at a first point and the density of the indicator is detected at a second point to generate an electrical waveform which rises to a peak value and decays thereafter substantially exponentially toward zero until recirculated indicator distorts the exponential tail comprising:
means for receiving said waveform and producing an output level substantially equal to said peak value after said waveform passes said peak value,
first means for dividing said output level by a given factor to produce a first level,
second means for dividing said output level by a given factor to produce a second level,
first means for comparing said waveform with said first level and producing a first signal when the amplitude of said waveform during the exponential decay is substantially equal to said first level,
second means for comparing said waveform with said second level and producing a second signal when the amplitude of said waveform during the exponential decay is substantially equal to said second level,
integrating means for receiving an input and producing a continuous integral of said input in the form of a continuous electrical signal,
means for transmitting said waveform to said integrating means so that said integrating means integrates said waveform,
means for disconnecting said integrating means from said waveform ans connecting said integrating means to said first dividing means so that said integrating means thereafter integrates said first level when said first comparing means produces said first signal,
means for disconnecting said integrating means from said first dividing means when said second comparing means produces said second signal,
means for dividing said output into a signal representing the amount of indicator injected so as to generate a signal indicating said rate of flow,
means for receiving said output and said peak value for comparing said output and said peak value with the constant value for generating a malfunction signal when said comparison indicates a malfunction,
means for receiving said first level and multiplying it by a given factor before said first level is integrated, and
means for calibrating said apparatus.

13. A method of determining the rate of flow of fluid in a closed circulatory system whereby a detectable indicator is injected into the system at a first point and the density of the indicator is detected at a second point to generate an electrical signal the waveform of which rises to a peak value and decays thereafter substantially exponentially toward zero until recirculated indicator distorts the exponential tail comprising:
receiving said waveform and producing an output level substantially equal to said peak value after said waveform passes said peak value,
dividing said output level by a given factor to produce a first level,
dividing said output level by a given factor to produce a second level,
comparing said waveform with said first level and producing a first signal when the amplitude of said waveform during the exponential decay is substantially equal to said first level,
comparing said waveform with said second level and producing a second signal when the amplitude of said waveform during the exponential decay is substantially equal to said second level,
integrating said waveform until said first signal is produced, and
integrating said first level after said first signal is produced and until said second signal is produced and terminating the integration when said second signal is produced.

14. A method as in claim 13 including the steps of receiving the integrated waveform and the integrated first level and said peak value, for comparing said integrated waveform and said integrated first level and said peak value with the constant value and generating a malfunction signal when said comparison indicates equivalence.

15. A method as in claim 13 including the steps of receiving said integrated waveform and said integrated first level and preventing comparing when said output level is less than a given preset value.

16. A method as in claim 13 including the steps of receiving said first level and multiplying it by a given factor before said first level is integrated.

17. A method as in claim 13 including the steps of dividing said output level into a signal representing the amount of indicator injected so as to generate a signal indicating said rate of flow.

18. A method of determining the rate of flow of fluid in a closed circulatory system comprising the steps of:
injecting a detectable indicator into the system at a first point,
detecting the density of the indicator at a second point to generate an electrical waveform which rises to a peak value and decays thereafter substantially exponentially toward zero until recirculated indicator distorts the exponential tail,
receiving said waveform and producing an output level substantially equal to said peak value after said waveform passes said peak value,
dividing said output level by a given factor to produce a first level, dividing said output level by a given factor to produce a second level, comparing said waveform with said first level and producing a first signal when the amplitude of said waveform during the exponential decay is substantially equal to said first level, comparing said waveform with said second level and producing a second signal when the amplitude of said waveform during the exponential decay is substantially equal to said second level, integrating said waveform until said first signal is produced, and integrating sad first level after said first signal is produced and until said second signal is produced.

* * * * *